(12) United States Patent
Nakamura et al.

(10) Patent No.: US 12,509,005 B2
(45) Date of Patent: Dec. 30, 2025

(54) VEHICLE UNDERCOVER AND MANUFACTURING METHOD THEREFOR

(71) Applicant: INOAC CORPORATION, Nagoya (JP)

(72) Inventors: Koji Nakamura, Anjo (JP); Takuya Sumi, Anjo (JP); Takashi Yamaguchi, Kaizu (JP)

(73) Assignee: INOAC CORPORATION, Nagoya (JP)

( * ) Notice: Subject to any disclaimer, the term of this patent is extended or adjusted under 35 U.S.C. 154(b) by 425 days.

(21) Appl. No.: 18/262,014

(22) PCT Filed: Jan. 18, 2022

(86) PCT No.: PCT/JP2022/001649
§ 371 (c)(1),
(2) Date: Jul. 19, 2023

(87) PCT Pub. No.: WO2022/158456
PCT Pub. Date: Jul. 28, 2022

(65) Prior Publication Data
US 2024/0075990 A1    Mar. 7, 2024

(30) Foreign Application Priority Data

Jan. 19, 2021 (JP) ................................ 2021-006700
Jun. 9, 2021 (JP) ................................ 2021-096706

(51) Int. Cl.
*B60R 13/08* (2006.01)
*B62D 25/20* (2006.01)

(52) U.S. Cl.
CPC .......... *B60R 13/0861* (2013.01); *B62D 25/20* (2013.01)

(58) Field of Classification Search
CPC . B60R 13/08; B60R 13/0838; B60R 13/0861; B62D 25/20; B62D 35/02
USPC .................................. 296/38, 180.1, 193.07
See application file for complete search history.

(56) References Cited

U.S. PATENT DOCUMENTS

| | | | |
|---|---|---|---|
| 10,500,809 B2 * | 12/2019 | Pfaffelhuber | ........... B32B 27/12 |
| 10,960,652 B2 * | 3/2021 | Miyano | ................... B32B 3/266 |
| 2006/0103171 A1 | 5/2006 | Blomeling et al. | |
| 2010/0219561 A1 * | 9/2010 | Pfaffelhuber | ....... B60R 13/0861 264/320 |
| 2020/0307470 A1 * | 10/2020 | Uhl | ..................... B60R 13/0861 |

FOREIGN PATENT DOCUMENTS

| | | | |
|---|---|---|---|
| CN | 1701006 A | 11/2005 | |
| DE | 102010063288 A1 | 6/2012 | |
| EP | 1520772 A1 * | 4/2005 | ............ B62D 35/02 |
| JP | 2004-142675 A | 5/2004 | |

(Continued)

*Primary Examiner* — Jason S Daniels
(74) *Attorney, Agent, or Firm* — SOLARIS Intellectual Property Group, LLC

(57) ABSTRACT

A vehicle undercover is provided with: a plate-shaped body made of a porous material such as a fiber body or a foam; and a support body supporting the plate-shaped body. The support body has a groove-shaped first frame part having a transverse plate and longitudinal plates extending from both edges of the transverse plate. Further, the support body has a second frame part provided across the first frame part and having a smaller dimension of protrusion toward the inside of a vehicle than the first frame part.

13 Claims, 24 Drawing Sheets

(56) References Cited

FOREIGN PATENT DOCUMENTS

| JP | 2009-149117 A | 7/2009 |
| JP | 2013-086599 A | 5/2013 |
| JP | 2014-058178 A | 4/2014 |
| JP | 2020-032554 A | 3/2020 |

* cited by examiner

VEHICLE UNDERCOVER AND MANUFACTURING METHOD THEREFOR

TECHNICAL FIELD

The present disclosure relates to a vehicle undercover such as an engine undercover and a manufacturing method for the vehicle undercover.

BACKGROUND ART

As in Patent Literature 1, an undercover is attached on a lower side of a vehicle body in a vehicle. The undercover of Patent Literature 1 is a plate-shaped body made of a synthetic resin, and is attached to a vehicle body with a bolt, a nut, or the like.

CITATION LIST

Patent Literature

Patent Literature 1: Japanese Patent Application Laid-Open (JP-A) No. 2014-58178

SUMMARY OF INVENTION

Technical Problem

For example, undercovers are required to have rigidity to prevent damage even if water is accumulated at a time of traveling on a flooded road. However, if the rigidity of the undercover is set too high, stress concentrates on a fastening portion attached to a vehicle body in a case in which an external force is applied to the undercover, the fastening portion is damaged. As a result, the undercover is easily detached.

An aspect of the present disclosure has been proposed in view of the above-described problems according to the conventional technique, to suitably solve these problems. An object of the disclosure is to provide a vehicle undercover having necessary rigidity and being not easily detached from a vehicle body, and a manufacturing method for a vehicle undercover.

Solution to Problem

An aspect of a vehicle undercover according to the disclosure includes:
- a plate-shaped body that is porous; and
- a support body to support the plate-shaped body, in which the support body includes:
  - a first frame part having a groove shape, and including a transverse plate and longitudinal plates respectively extending from both edges of the transverse plate; and
  - a second frame part provided so as to intersect with the first frame part and having a smaller protruding dimension toward a vehicle inner side than a protruding dimension of the first frame part.

An aspect of a manufacturing method for a vehicle undercover according to the disclosure includes:
- setting a plate-shaped body that is porous, in a molding die;
- molding, in the molding die, a support body made of a synthetic resin and including a first frame part and a second frame part, in which the first frame part has a groove shape formed by a transverse plate and longitudinal plates respectively extending from both edges of the transverse plate, and the second frame part is provided so as to intersect with the first frame part and has a smaller protruding dimension toward a vehicle inner side than a protruding dimension of the first frame part; and
- obtaining a vehicle undercover in which the plate-shaped body and the support body are joined.

Advantageous Effects of Invention

According to one aspect of the vehicle undercover according to the disclosure, the undercover has necessary rigidity and is not easily detached from a vehicle body.

According to one aspect of the manufacturing method for a vehicle undercover according to the disclosure, it is possible to easily obtain a vehicle undercover having necessary rigidity and being not easily detached from a vehicle body.

DESCRIPTION OF EMBODIMENTS

Figure 1:
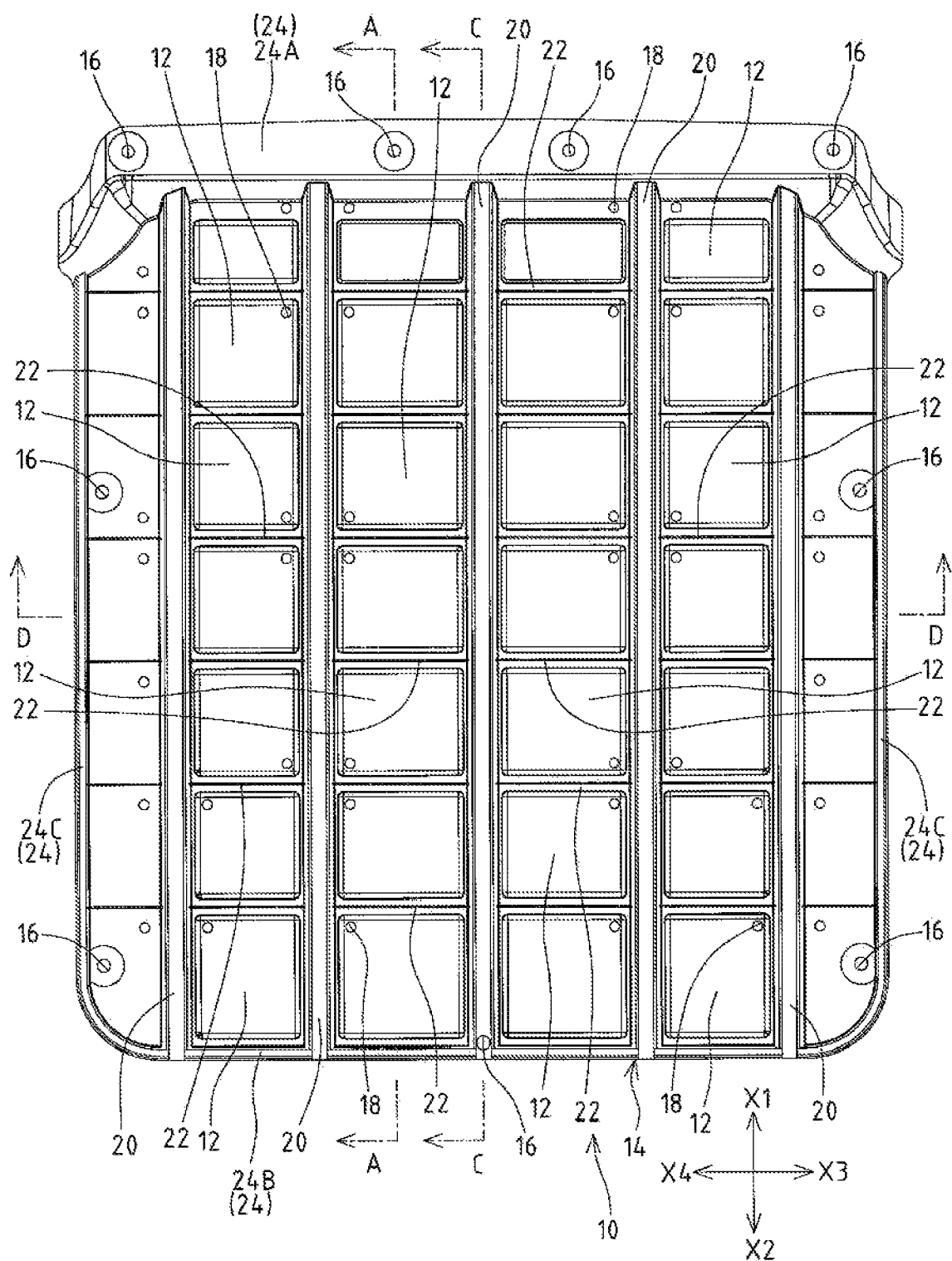
FIG. 1 is a plan view illustrating an engine undercover according to a first embodiment of the disclosure.

Next, by giving preferred examples, a vehicle undercover and a manufacturing method for a vehicle undercover according to the disclosure will be described below with reference to the accompanying drawings. The vehicle undercover according to the disclosure can be suitably used as a vehicle exterior member such as an engine undercover, a floor undercover, and a fender liner, and as other vehicle components. In embodiments, an engine undercover attached on a lower side of an engine room in a vehicle will be described as an example of the vehicle undercover. In the engine undercover described in the following embodiments, a vehicle inner side is an upper side, and a vehicle outer side is a lower side. In the arrows illustrated in FIGS. 1 and 9, X1 is a vehicle front side, X2 is a vehicle rear side, X3 is a vehicle right side, X4 is a vehicle left side, X5 is an upper side, and X6 is a lower side.

EXAMPLES

First Embodiment

As illustrated in FIGS. 1 to 4A, an engine undercover (a vehicle undercover) 10 of a first embodiment includes a plate-shaped body 12 and a support body 14 that supports the plate-shaped body 12. The plate-shaped body 12 is made mainly of a porous material. The support body 14 is made of a synthetic resin. In the engine undercover 10, the plate-shaped body 12 and the support body 14 are joined. The support body 14 is provided with an attachment part 16. The engine undercover 10 is attached to a vehicle body of a vehicle with use of the attachment part 16 of the support body 14. In the first embodiment, the engine undercover 10 is attached to the vehicle body by passing a fastening member such as a bolt or a rivet through the hole-shaped attachment part 16. Reference numeral 18 indicates a drain hole that vertically penetrates the plate-shaped body 12 and the support body 14.

As the porous material, for example, a fiber body, a foam, or the like can be used. The plate-shaped body 12 exhibits required functions such as sound absorption and heat insulation depending on characteristics derived from the porous material. In the plate-shaped body 12, the engine undercover 10 suppresses vehicle external noise such as engine sound and traveling sound. As the fiber body, a nonwoven fabric, a woven fabric, or the like made of polyester fibers, polyolefin fibers, aramid fibers, glass fibers, cellulose fibers, nylon fibers, vinylon fibers, rayon fibers, or the like can be used. As the foam, a foam of polyurethane-based, polyolefin-based, polystyrene-based, or the like can be used. For the plate-shaped body 12, a porous material having air permeability is preferable from the viewpoint of sound absorbency.

The plate-shaped body 12 may include one layer, or may include two or more layers. For example, the plate-shaped body 12 can have a multilayer structure including a first layer and a second layer disposed to overlap with the first layer. For example, the first layer can be given with a main function (sound absorption in the embodiment) required of the plate-shaped body 12. In addition, the second layer can be given with an auxiliary function (water repellency in the first embodiment) added to the plate-shaped body 12. In this case, by setting a density of the second layer higher than that of the first layer, water repellency of the second layer can be secured. Water repellency can also be secured by adding a water repellent material such as a silicone resin or a fluororesin to the second layer. In this way, by imparting water repellency to the second layer that is to be on the vehicle outer side in the plate-shaped body 12, it is possible to prevent water from entering the plate-shaped body 12, snow from adhering to the plate-shaped body 12, and icing to the plate-shaped body 12, which is preferable. For example, a sheet of a fiber body such as a nonwoven fabric, a sheet of a foam, or the like may be disposed to overlap with a part or the entire upper side (the vehicle inner side) of the engine undercover 10.

The support body 14 is a molded article obtained by injection molding of a synthetic resin or the like. As the synthetic resin, polypropylene (PP), polyethylene (PE), acrylonitrile-butadiene-styrene (ABS), polyvinyl chloride (PVC), polyethylene terephthalate (PET), polyamide (PA), or the like can be used.

As illustrated in FIG. 1, the support body 14 includes a plurality of frame parts 20 and 22 crossing each other. Specifically, the support body 14 includes a first frame part 20 and a second frame part 22. The first frame part 20 extends in a front-rear direction of the vehicle. The second frame part 22 extends in a direction across the first frame part 20 (a lateral direction of the vehicle). The support body 14 includes an outer frame part 24 constituting an outer edge of the engine undercover 10. The first frame part 20 and the second frame part 22 arranged in a lattice shape continuously inside the outer frame part 24. Then, the plate-shaped body 12 is disposed inside a plurality of sections formed side by side in the front and rear and the left and right by the first frame part 20 and the second frame part 22, or by the first frame part 20, the second frame part 22, and the outer frame part 24. The support body 14 is a molded article in which the first frame part 20, the second frame part 22, and the outer frame part 24 are integrally molded. The outer frame part 24 on the vehicle front side constituting a front edge of the engine undercover 10 is referred to as a front outer frame part 24A in a case of being particularly distinguished. The outer frame part 24 on the vehicle rear side constituting a rear edge of the engine undercover 10 is referred to as a rear outer frame part 24B in a case of being particularly distinguished. The outer frame part 24 on a vehicle lateral side constituting a side edge of the engine undercover 10 is referred to as a lateral outer frame part 24C in a case of being particularly distinguished.

Figure 2:
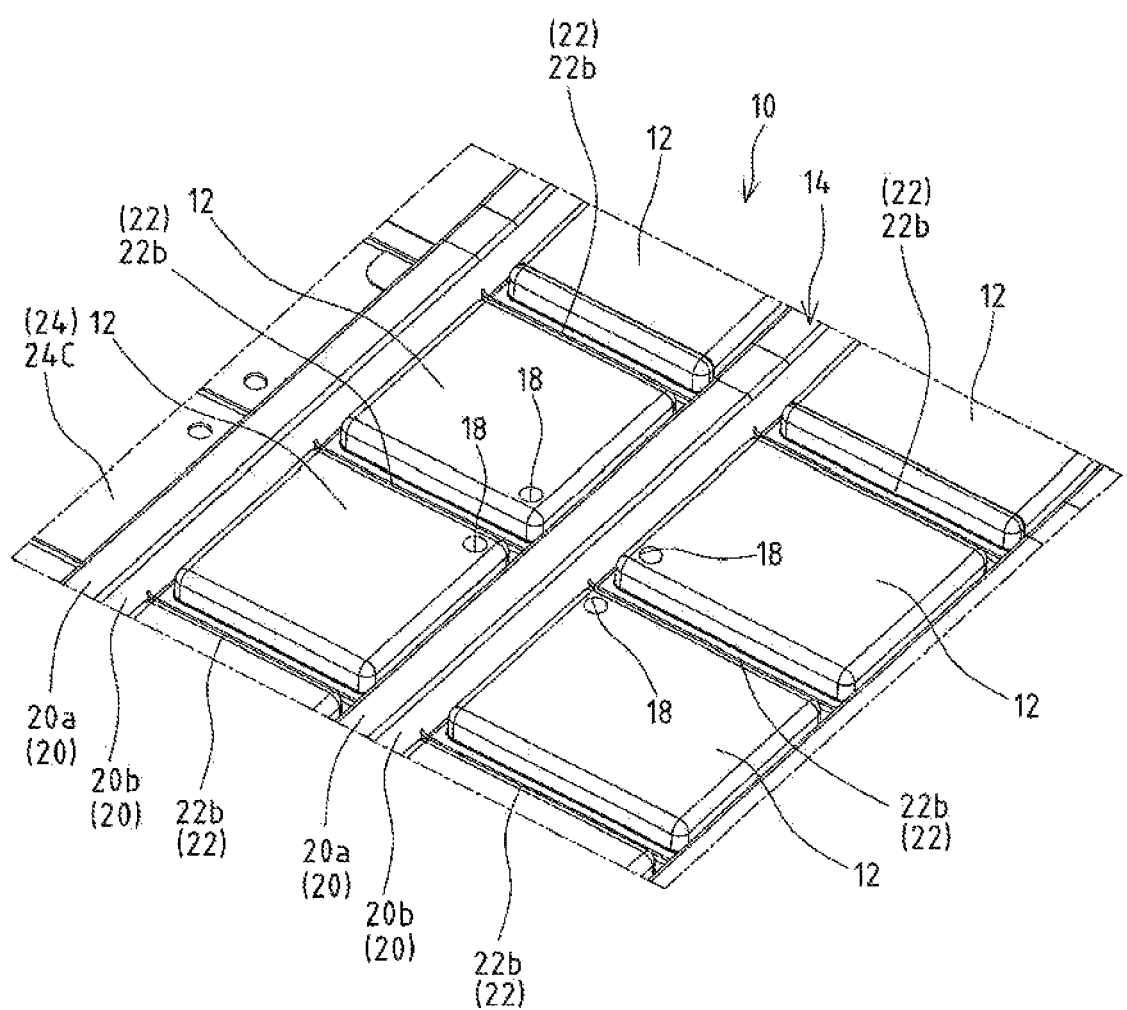
FIG. 2 is a schematic perspective view illustrating a part of the engine undercover of the first embodiment, from an upper side (a vehicle inner side).
Figure 6A:
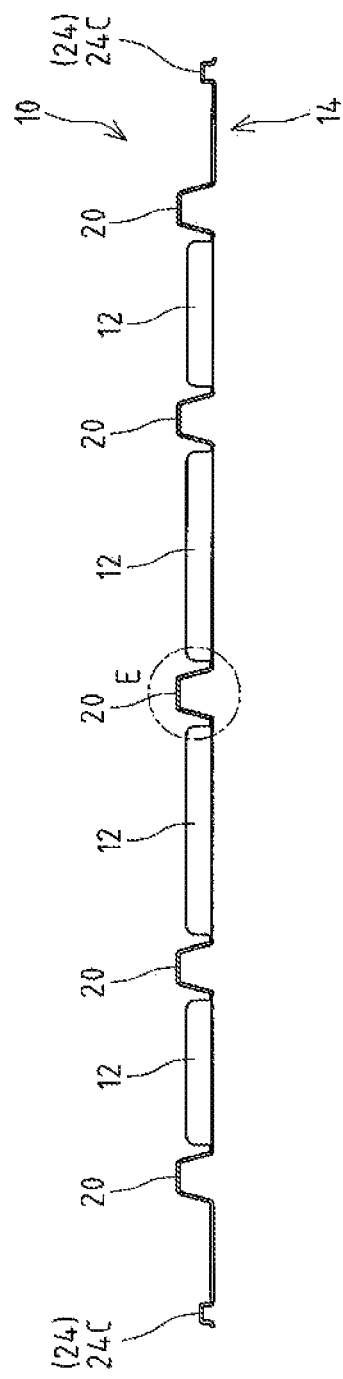
FIG. 6A is an end view cut at a position corresponding to line D-D in FIG. 1.
Figure 6B:
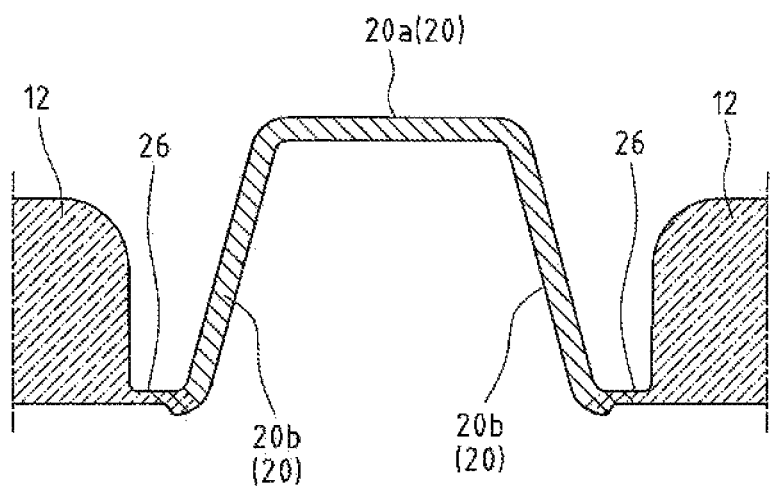
FIG. 6B is an enlarged view of a portion E in FIG. 6A.

As illustrated in FIGS. 2, 6A, and 6B, the first frame part 20 is formed in a groove shape. The first frame part 20 includes a transverse plate 20a, and longitudinal plates 20b individually extending from left and right edges of the transverse plate 20a. In the first frame part 20, the plate-shaped body 12 is connected to a lower end part of the longitudinal plate 20b. In the first frame part 20, the transverse plate 20a projects so as to be positioned on the upper side from an upper surface of the plate-shaped body 12. In other words, the first frame part 20 is recessed from the lower side (the vehicle outer side) toward the upper side (the vehicle inner side). A portion between the left and right longitudinal plates 20b and 20b in the first frame part 20 is opened to the lower side. In the first embodiment, one first frame part 20 extends in the front-rear direction, but a plurality of first frame parts 20 may be arranged in series in the front-rear direction.

Figure 5:
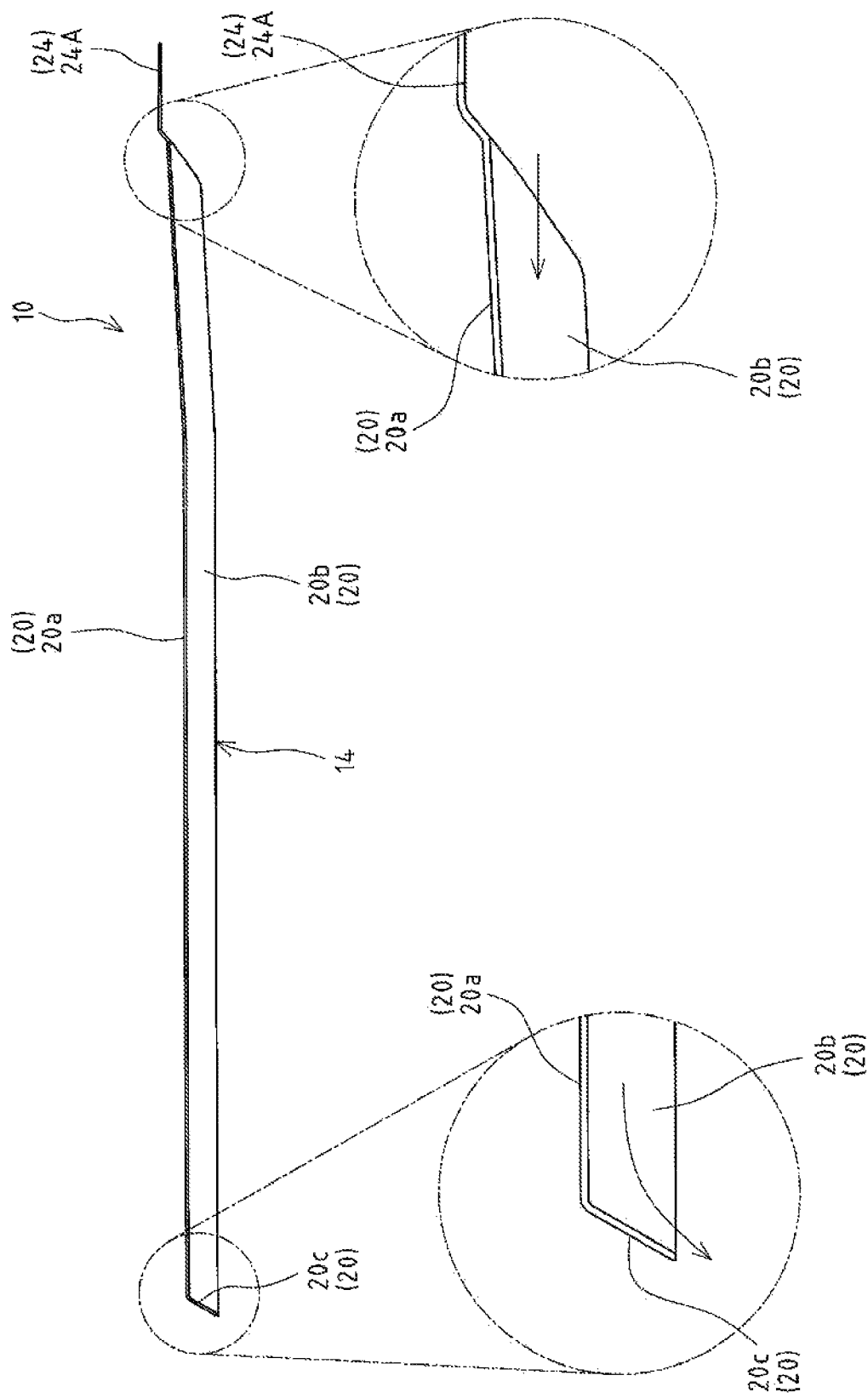
FIG. 5 is an end view cut at a position corresponding to line C-C in FIG. 1.

As illustrated in FIG. 5, in the engine undercover 10, the groove shape of the first frame part 20 is formed to extend in the front-rear direction of the vehicle. The vehicle front side of the first frame part 20 is opened. Specifically, the front outer frame part 24A of the support body 14 projects to the upper side (the vehicle inner side) from the plate-shaped body 12 (and the transverse plate 20a). The transverse plate 20a and the longitudinal plates 20b and 20b are formed continuously with a standing wall of the front outer frame part 24A. The first frame part 20 penetrates the standing wall of front outer frame part 24A. In this way, the first frame part 20 does not include a wall that closes the vehicle front side. In a case in which the plurality of first frame parts 20 are arranged in series in the front-rear direction, it suffices that the first frame part 20 located on the most vehicle front side is opened to the vehicle front side.

As illustrated in FIG. 5, the first frame part 20 may include an inclined part 20c that is inclined to the vehicle outer side as approaching the vehicle rear side from the vehicle front side. The inclined part 20c is formed continuously with the transverse plate 20a. In the first embodiment, the inclined part 20c is provided at a rear edge part of the first frame part 20 continuous with the rear outer frame part 24B. Note that the inclined part 20c may be provided at an intermediate position in the front-rear direction of the first frame part 20. The first frame part 20 may be formed such that the vehicle rear side is opened. In a case in which a wall has to stand inside the groove shape, the above-described inclined part 20c is desirable.

As illustrated in FIG. 1, the second frame part 22 is provided between the first frame parts 20 and 20 adjacent to each other on the left and right. The second frame part 22 is configured to have lower rigidity than the first frame part 20. As illustrated in FIG. 2, for example, the second frame part 22 is formed to have a smaller protruding dimension to the upper side (the vehicle inner side) than that of the first frame part 20. More specifically, the second frame part 22 includes a base part 22a, and a standing part 22b standing from the base part 22a toward the upper side (the vehicle inner side) (see FIGS. 4A and 4B). In the first embodiment, the first frame part 20 has a "U" shape in cross section formed by the transverse plate 20a and the left and right longitudinal plates 20b and 20b. Whereas, the second frame part 22 has a "T" shape in cross section formed by the plate-shaped base part 22a and the plate-shaped standing part 22b. A vertical dimension of the standing part 22b is smaller than a vertical dimension of the longitudinal plate 20b in the first frame part 20. An upper end of the standing part 22b is located lower than the transverse plate 20a (the vehicle outer side). In the first embodiment, the upper end of the standing part 22b is at a position (the vehicle outer side) lower than the upper surface of the plate-shaped body 12, but may be at a position higher than the upper surface of the plate-shaped body 12. In the first embodiment, the lateral outer frame part 24C is provided with a rib shape similar to that of the standing part 22b.

As illustrated in FIG. 2, in the second frame part 22, the base part 22a is connected to the lower end of the longitudinal plate 20b of the first frame part 20. The standing part 22b is connected to the longitudinal plate 20b. The base part 22a is connected to the plate-shaped body 12 (see FIGS. 4A and 4B). In the first embodiment, the synthetic resin constituting the base part 22a is impregnated into and integrated with the plate-shaped body 12. The standing part 22b is provided to overlap with the plate-shaped body 12. The first frame part 20 is provided between the left and right plate-shaped bodies 12 and 12 separated from each other. The plate-shaped bodies 12 adjacent to each other on the left and right are supported by the first frame part 20. Whereas, the second frame part 22 is provided to overlap with the plate-shaped body 12 which is continuous in the front and rear. The plate-shaped body 12 is supported by the second frame part 22.

Figure 3:
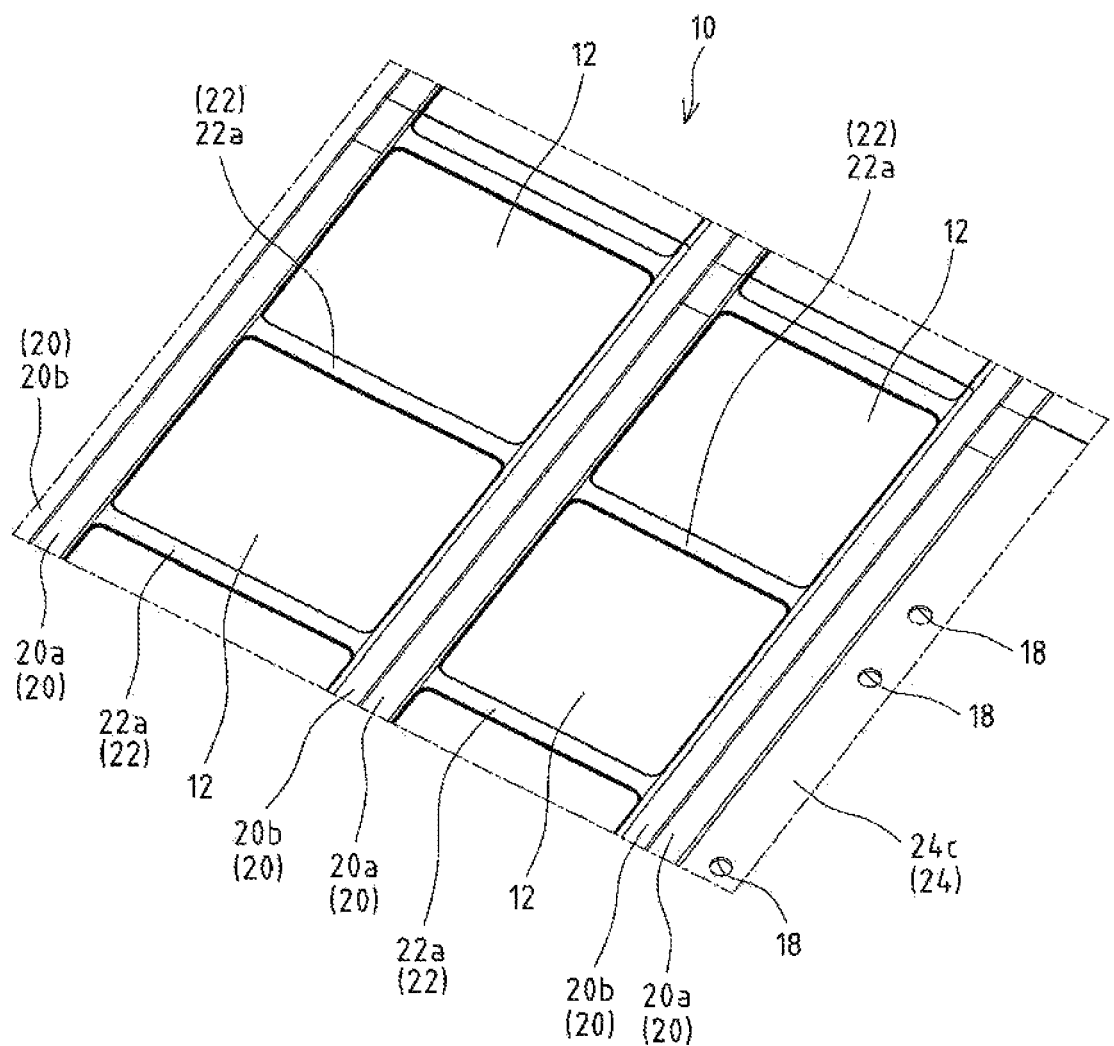
FIG. 3 is a schematic perspective view illustrating a part of the engine undercover of the first embodiment, from a lower side (a vehicle outer side).
Figure 4A:
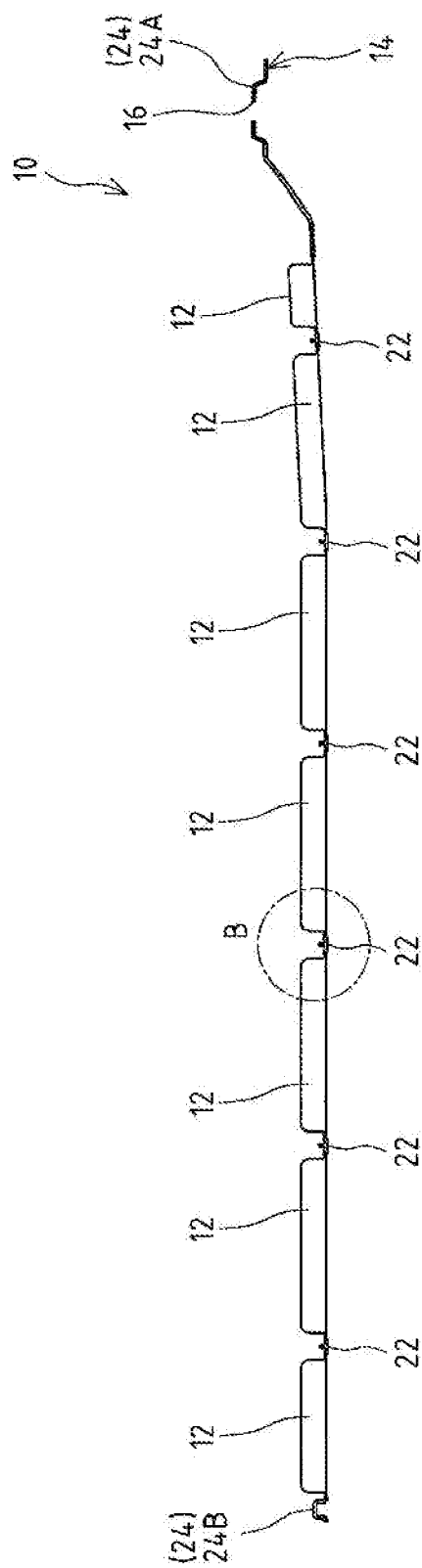
FIG. 4A is an end view cut at a position corresponding to line A-A in FIG. 1.
Figure 4B:
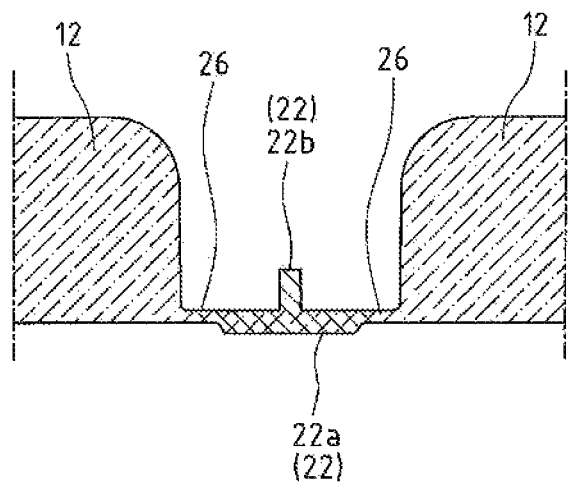
FIG. 4B is an enlarged view of a portion B in FIG. 4A.

As illustrated in FIGS. 4A and 4B, in the second frame part 22, the base part 22a is formed to have a larger front-rear dimension than that of the standing part 22b. The second frame part 22 has a connection portion connected to the longitudinal plate 20b of the first frame part 20. A lower part of the connection portion of the second frame part 22 is formed to be wider than an upper part of the second frame part 22. As illustrated in FIG. 3, a portion of the base part 22a connected to the longitudinal plate 20b is wider than an intermediate portion of the base part 22a between the first frame parts 20 and 20 such that the longitudinal plate 20b side is wider.

As illustrated in FIG. 4A, an edge of the rear outer frame part 24B is formed in a groove shape. Similarly to the first frame part 20, the groove shape of the rear outer frame part 24B projects on the upper side and is opened toward the lower side. A protruding dimension on the upper side of the groove shape of the rear outer frame part 24B is set smaller than that of the first frame part 20. Rigidity of the groove shape of the rear outer frame part 24B is made smaller than that of the first frame part 20. As illustrated in FIG. 6A, an edge of the lateral outer frame part 24C is formed in a groove shape. Similar to the first frame part 20, the groove shape of the lateral outer frame part 24C projects on the upper side and is opened toward the lower side. A protruding dimension on the upper side of the groove shape of the lateral outer frame part 24C is set smaller than that of the first frame part 20. Rigidity of the groove shape of the lateral outer frame part 24C is made smaller than that of the first frame part 20.

As illustrated in FIGS. 4A, 4B, 6A, and 6B, a compression part 26 is provided at a portion of the plate-shaped body 12 connected to the frame parts 20 and 22. The compression part 26 is recessed so as to be opened upward from the upper surface of the plate-shaped body 12. The compression part 26 is thinner than a central portion of the plate-shaped body 12. A density of the compression part 26 is higher than the central portion of the plate-shaped body 12. The synthetic resin constituting the frame parts 20 and 22 is less likely to enter the compression part 26.

The engine undercover 10 of the first embodiment is obtained by insert molding for molding the support body 14 by a molding die 30 in which a sheet S to be the plate-shaped body 12 is set (see FIGS. 7A, 7B, 7C, 8A, 8B, and 8C). In the engine undercover 10, the plate-shaped body 12 and the support body 14 are integrated with use of a joining force of the support body 14 itself formed by curing a synthetic resin.

Specifically, the engine undercover 10 can be manufactured as follows. First, the sheet S to be the plate-shaped body 12 is prepared (see FIGS. 7A and 8A). For example, the sheet S is prepared in which a fragile part Sa due to an opening, a cut, or the like is formed at a position corresponding to the first frame part 20 (see FIG. 8A). The sheet S is set in the opened molding die 30. As another method, a plurality of sheets S formed to be slightly wider than a dimension between the first frame parts 20 and 20 adjacent to each other on the left and right are prepared. Then, the strip-shaped sheet S may be set in the opened molding die 30. The sheet S can be formed by punching work with, for example, a Thomson blade or the like. It suffices that the fragile part Sa is formed in accordance with cutting of an outer shape.

Figure 8A:
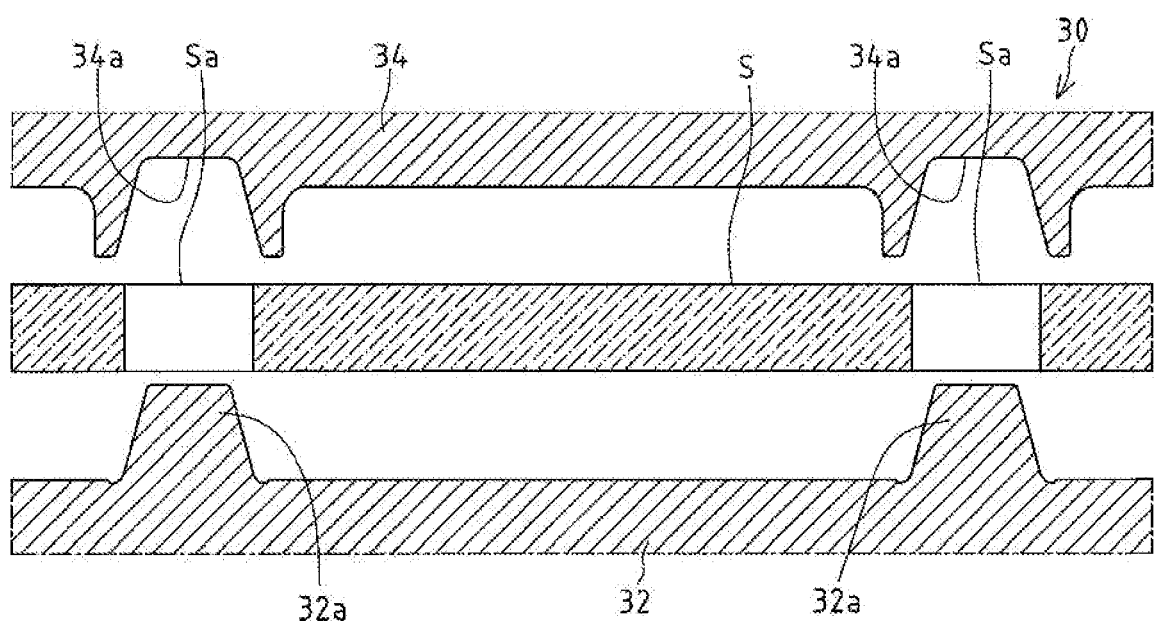
FIG. 8A is an explanatory view illustrating the manufacturing process of the engine undercover according to the first embodiment.
Figure 8B:
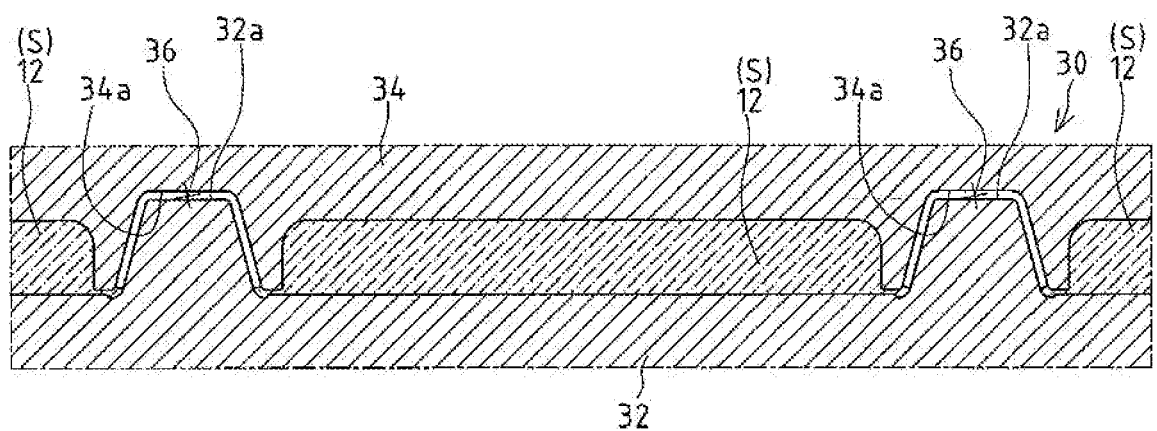
FIG. 8B is an explanatory view illustrating the manufacturing process of the engine undercover according to the first embodiment.

The fragile part Sa of the sheet S is set to a first frame forming convex part 32a that forms a lower surface of the first frame part 20 in a first die 32 (see FIG. 8A). At this time, the sheet S is disposed to overlap with a portion that forms a lower surface of the second frame part 22 in the first die 32 (see FIG. 7A). When the molding die 30 is closed, the fragile part Sa is pushed by the first frame forming convex part 32a. Further, the fragile part Sa is pushed against an opening edge of a first frame forming concave part 34a that forms an upper surface of the first frame part 20 in a second die 34. As a result, the fragile part Sa is broken. Then, the sheet S is divided with the first frame forming convex part 32a interposed therebetween (see FIG. 8B). An end part of the divided sheet S is compressed and held between the opening edge of the first frame forming concave part 34a and the first die 32. When the molding die 30 is closed, the sheet S is compressed and held by a second frame forming part 34b that forms an upper surface of the second frame part 22 in the second die 34 (see FIG. 7B).

By the mold closing, a cavity 36 corresponding to the first frame part 20 is formed between the first frame forming convex part 32a and the first frame forming concave part 34a. An end part of the sheet S has entered the cavity 36. The cavity 36 corresponding to the standing part 22b of the second frame part 22 is formed between the second frame forming part 34b and the sheet S.

Figure 7A:
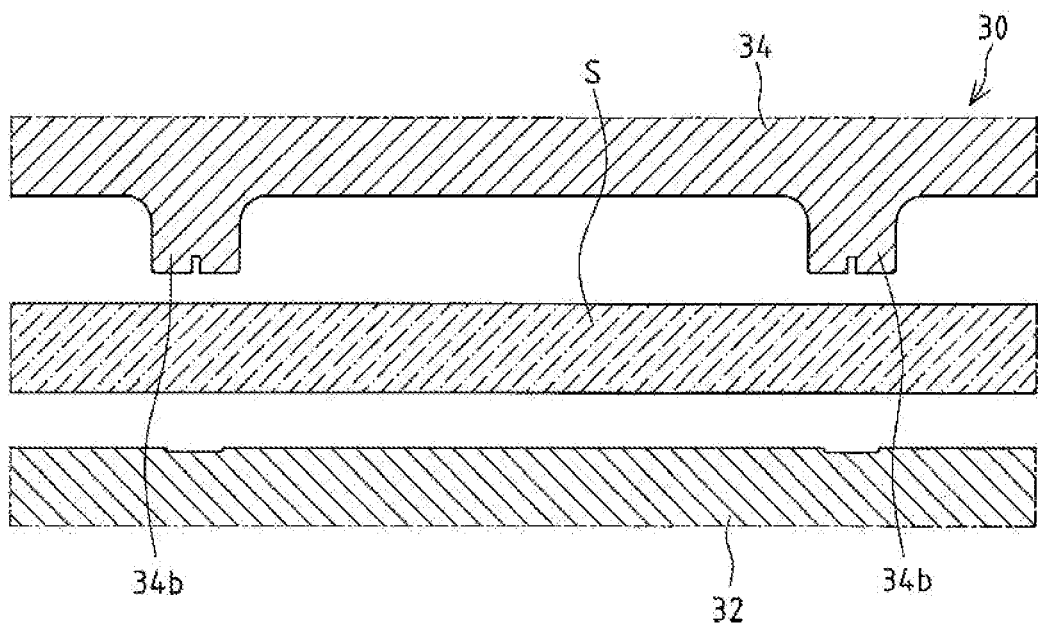
FIG. 7A is an explanatory view illustrating a manufacturing process of the engine undercover according to the first embodiment.
Figure 7B:
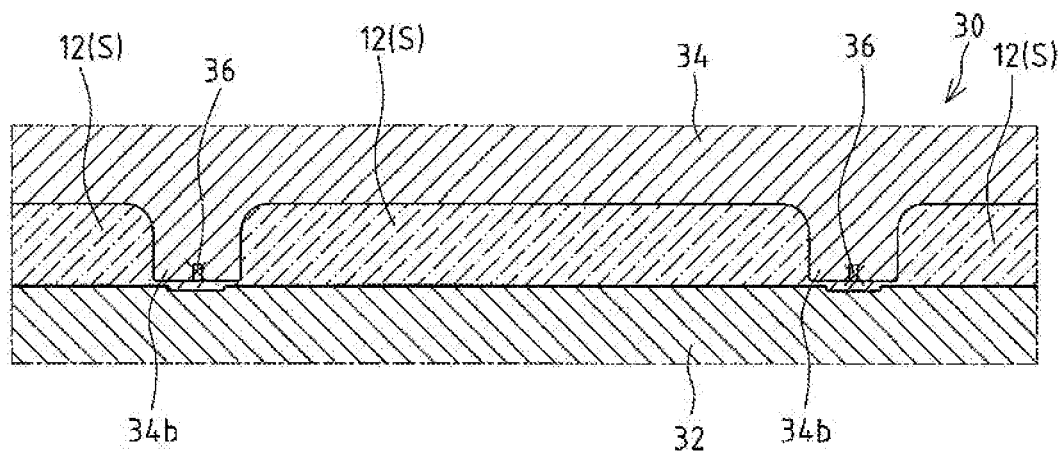
FIG. 7B is an explanatory view illustrating the manufacturing process of the engine undercover according to the first embodiment.
Figure 7C:
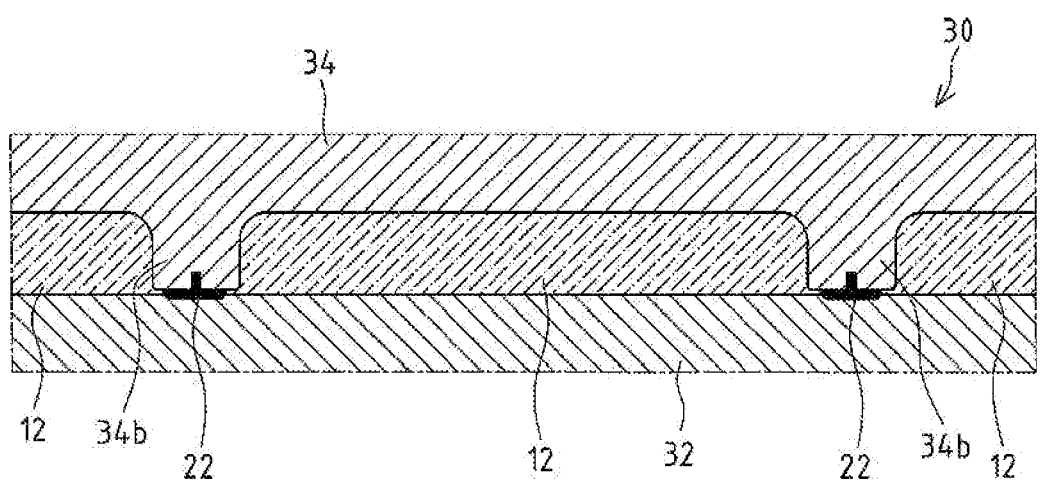
FIG. 7C is an explanatory view illustrating the manufacturing process of the engine undercover according to the first embodiment.
Figure 8C:
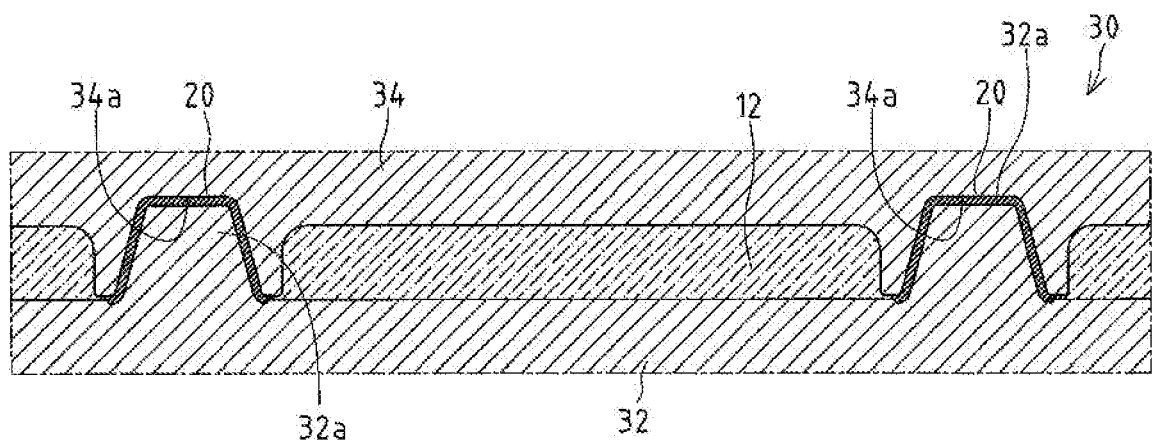
FIG. 8C is an explanatory view illustrating the manufacturing process of the engine undercover according to the first embodiment.

A resin material is injected into the cavity 36 from gates (not illustrated) provided at a plurality of places, and the support body 14 is injection-molded (see FIGS. 7C and 8C). At this time, for example, the resin material flows from the cavity 36 corresponding to the outer frame part 24 to the cavity 36 corresponding to the first frame part 20 or the second frame part 22. The resin material flows from the cavity 36 corresponding to the first frame part 20 to the cavity 36 corresponding to the second frame part 22. The resin material flows from the cavity 36 corresponding to the second frame part 22 to the cavity 36 corresponding to the first frame part 20. Thus, the resin material flows in various paths and spreads throughout the cavity 36.

An end part of the plate-shaped body 12 (the sheet S) has entered the cavity 36 between the first frame forming convex part 32a and the first frame forming concave part 34a. In this state, the first frame part 20 is molded. At this time, the vicinity of the first frame part 20 in the plate-shaped body 12 (the sheet S) is compressed by an opening edge of the first frame forming concave part 34a. As a result, impregnation of the plate-shaped body 12 with the resin material can be suppressed. In the cavity 36 between the second frame forming part 34b and the sheet S, the standing part 22b of the second frame part 22 is molded. Further, the base part 22a is molded by impregnating the sheet S with the resin material. At this time, the vicinity of the second frame part 22 in the plate-shaped body 12 (the sheet S) is compressed more than a portion corresponding to the base part 22a. As a result, impregnation of the plate-shaped body 12 with the resin material can be suppressed. The first frame part 20 is molded between the plate-shaped bodies 12 adjacent to each other in the left-right direction. The second frame part 22 is molded to overlap with the plate-shaped body 12. Then, the obtained engine undercover 10 is taken out from the opened molding die 30. Thus, according to the manufacturing method, the engine undercover 10 in which the plate-shaped body 12 is supported by the support body 14 can be easily obtained.

In the engine undercover 10, the relatively soft plate-shaped body 12 is supported by the support body 14. The support body 14 includes the groove-shaped first frame part 20, and the second frame part 22 having a smaller protruding dimension toward the vehicle inner side than that of the first frame part 20. By forming the first frame part 20 into the groove shape having the transverse plate 20a and the longitudinal plate 20b extending from both edges of the transverse plate 20a, sufficient rigidity can be secured by shape characteristics thereof. Further, by making the protruding dimension of the second frame part 22 smaller than that of the first frame part 20, the rigidity of the second frame part 22 can be made smaller than that of the first frame part 20. In this way, the engine undercover 10 can release, by deformation of the second frame part 22, a load in a case in which water is placed due to traveling on a flooded road, and vibration during traveling, and a load due to collision of curbstones and snow and ice on a road. This makes it possible to suppress application of an excessive load to the attachment part 16 to the vehicle body. Therefore, the engine undercover 10 has necessary rigidity and is not easily detached from the vehicle body.

Since the engine undercover 10 can ensure rigidity by the support body 14, it is not necessary to provide rigidity by compressing the plate-shaped body 12 or the like. For example, by being able to secure a thickness and a void of the plate-shaped body 12, performance such as sound absorption can be improved. In addition, cost can be reduced by reducing a basis weight.

The first frame part 20 has a groove shape recessed from the vehicle outer side toward the vehicle inner side. The groove shape of the first frame part 20 extends in the front-rear direction of the vehicle. The groove shape of the first frame part 20 is opened to the vehicle front side. In this way, in the engine undercover 10, since the groove-shaped first frame part 20 extends in the vehicle front and rear, a flow straightening effect for the air on the vehicle lower side can be obtained by the first frame part 20. This is advantageous in terms of aerodynamic properties. Moreover, since the vehicle front side of the first frame part 20 is opened, air easily passes through the groove of the first frame part 20. As a result, a flow straightening action by the first frame part 20 can be more effectively obtained.

The first frame part 20 includes the inclined part 20c formed continuously with the transverse plate 20a. The inclined part 20c is inclined to the vehicle outer side as approaching the vehicle rear side from the vehicle front side. The inclined part 20c allows air to easily escape from the groove-shaped first frame part 20 to the vehicle rear side, in the engine undercover 10. Therefore, the flow straightening action by the first frame part 20 is effectively obtained, which is advantageous in terms of aerodynamic characteristics.

The first frame part 20 is provided between the plate-shaped bodies 12 and 12 adjacent to each other in the left-right direction. Then, the separated plate-shaped bodies 12 and 12 are connected by the first frame part 20 having relatively high rigidity. This allows the plate-shaped body 12 to be appropriately supported. In addition, the second frame part 22 is provided to overlap with the plate-shaped body 12. As a result, even the second frame part 22 having relatively low rigidity can appropriately support the plate-shaped body 12. The first frame part 20 is molded between the plate-shaped bodies 12 and 12 adjacent to each other in the left-right direction. In this way, by molding the first frame part 20, the plate-shaped body 12 (the sheet S) can be easily connected. The second frame part 22 is molded to overlap with the plate-shaped body 12. This can omit time and effort for dividing the sheet S. Therefore, setting of the sheet S in the molding die 30 can be facilitated.

The second frame part 22 has a connection portion connected to the longitudinal plate 20b of the first frame part 20. A lower part of the connection portion is formed to be wider than an upper part of the connection portion. This can improve strength of the connection portion of the second frame part 22 to the first frame part 20. In addition, at the time of molding the support body 14, the resin material can easily flow between the cavity 36 corresponding to the second frame part 22 and the cavity 36 corresponding to the first frame part 20. Therefore, quality of the obtained engine undercover 10 can be stabilized.

Second Embodiment

Figure 9:
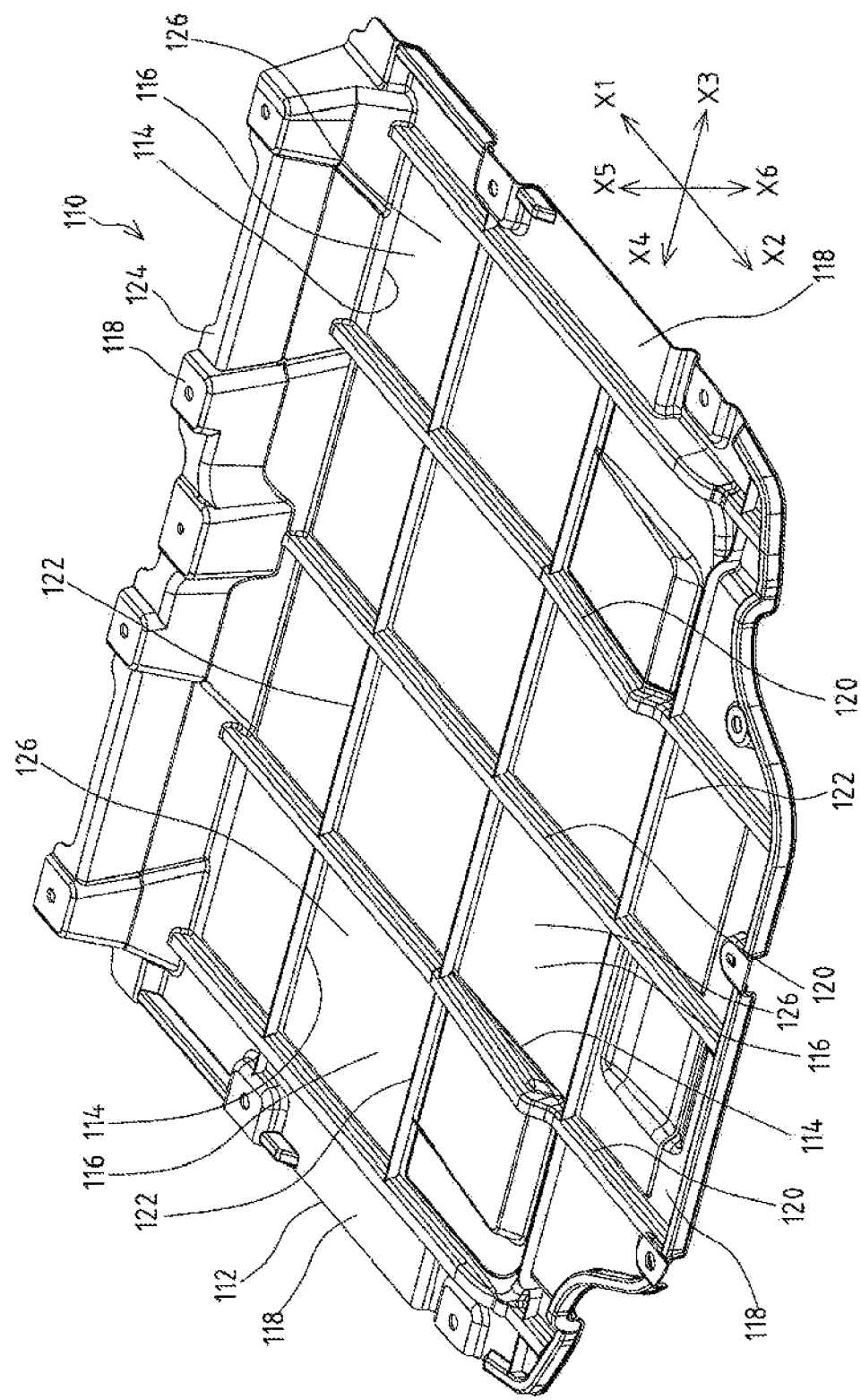
FIG. 9 is a schematic perspective view of a vehicle undercover according to a second embodiment of the disclosure, as viewed obliquely from an upper side.
Figure 10:
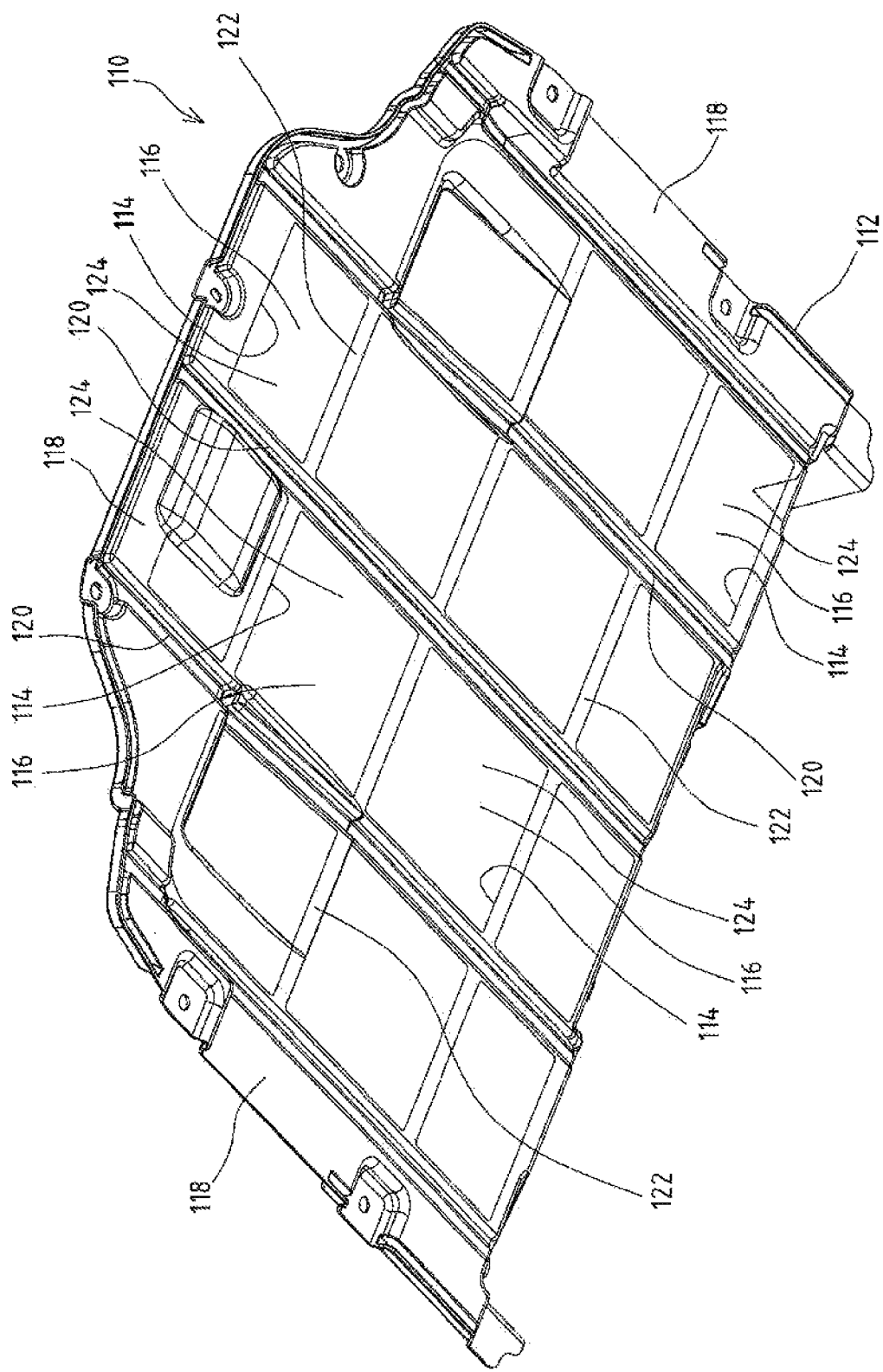
FIG. 10 is a schematic perspective view of the vehicle undercover according to the second embodiment, as viewed obliquely from a lower side.
Figure 11:
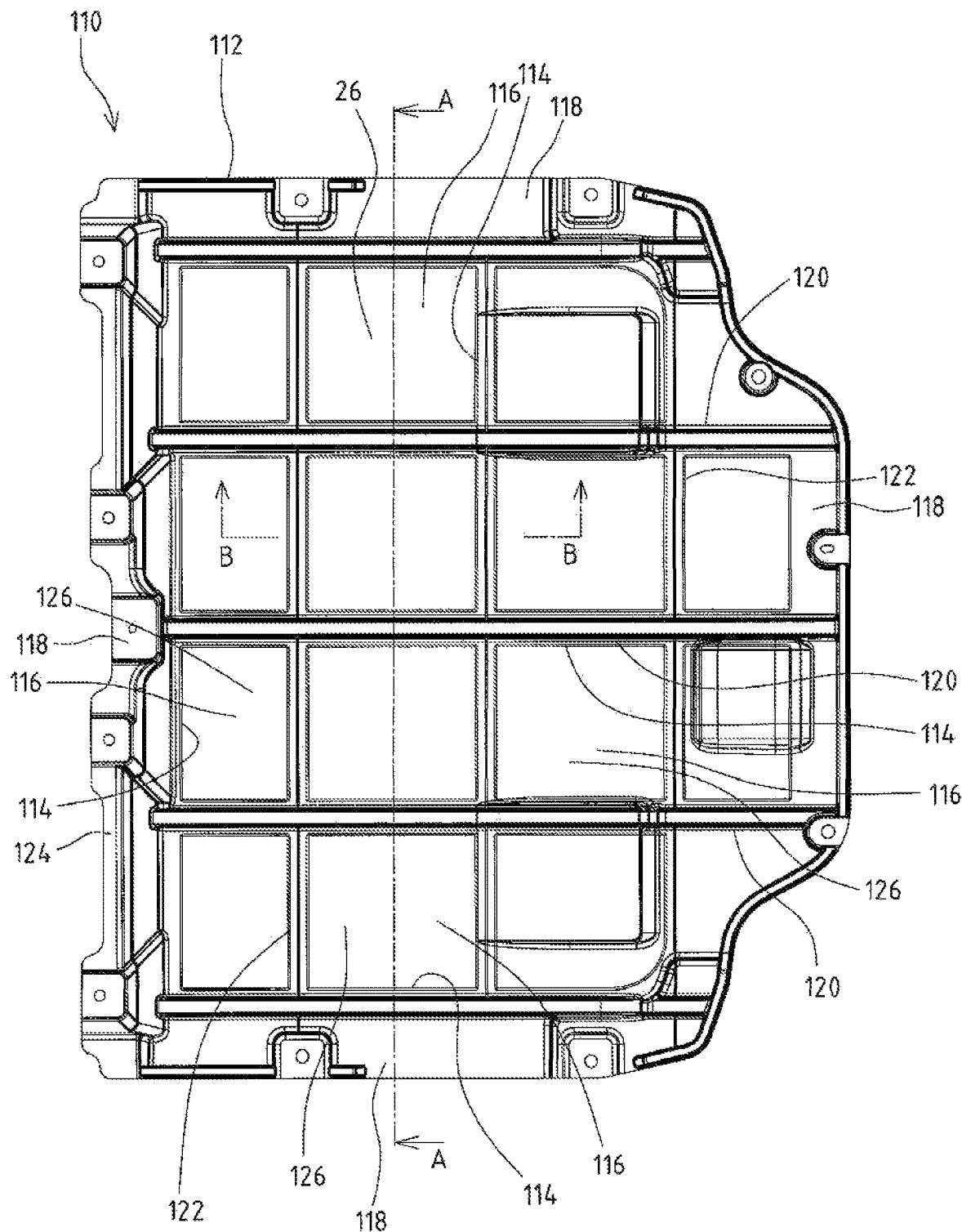
FIG. 11 is a plan view illustrating the vehicle undercover according to the second embodiment.

As illustrated in FIGS. 9 to 11, an engine undercover 110 according to a second embodiment includes a support body 112 made of a synthetic resin, and a sound absorbing part 116 as a plate-shaped body supported by the support body 112. The sound absorbing part 116 is provided for each opening portion 114, so as to close the opening portion 114 sectioned by the support body 112. In the engine undercover 110, the support body 112 and the sound absorbing part 116 are connected to each other by being integrated at the time of molding of the support body 112, being bonded with an adhesive, or being welded by heat or the like. In the engine undercover 110, rigidity is mainly secured by the support body 112 harder than the sound absorbing part 116. The engine undercover 110 is attached to a vehicle body of a vehicle with use of an attachment portion provided to the support body 112.

The support body 112 is a molded article obtained by injection molding of a synthetic resin or the like. As the synthetic resin, polypropylene (PP), polyethylene (PE), acrylonitrile-butadiene-styrene (ABS), polyvinyl chloride (PVC), polyethylene terephthalate (PET), polyamide (PA), or the like can be used.

As illustrated in FIGS. 9 to 11, the support body 112 of the second embodiment includes an outer peripheral part 118 and frame parts 120 and 122 formed inside the outer peripheral part 118. A portion to attach to the vehicle body is formed on the outer peripheral part 118. The frame parts 120 and 122 are formed in a lattice shape extending in the front-rear and left-right directions. The opening portion 114 is formed by being surrounded by the four frame parts 120 and 122, or the outer peripheral part 118 and the frame parts 120 and 122. In the support body 112 of the second embodiment, a plurality of opening portions 114 are arranged side by side in the front and rear and the left and right.

The sound absorbing part 116 has air permeability. The sound absorbing part 116 can be made by a porous body such as a nonwoven fabric or a foam. The engine undercover 110 suppresses external noise such as engine sound and traveling sound, by the sound absorbing part 116 having a large number of voids. As the nonwoven fabric, a nonwoven fabric made of polyester fibers, polyolefin fibers, aramid fibers, glass fibers, cellulose fibers, nylon fibers, vinylon fibers, rayon fibers, or the like can be used. As the foam, a foam of polyurethane-based, polyolefin-based, polystyrene-based, or the like can be used. A thickness of the sound absorbing part 116 is set to, for example, about from 7.5 mm to 32 mm.

Figure 12:
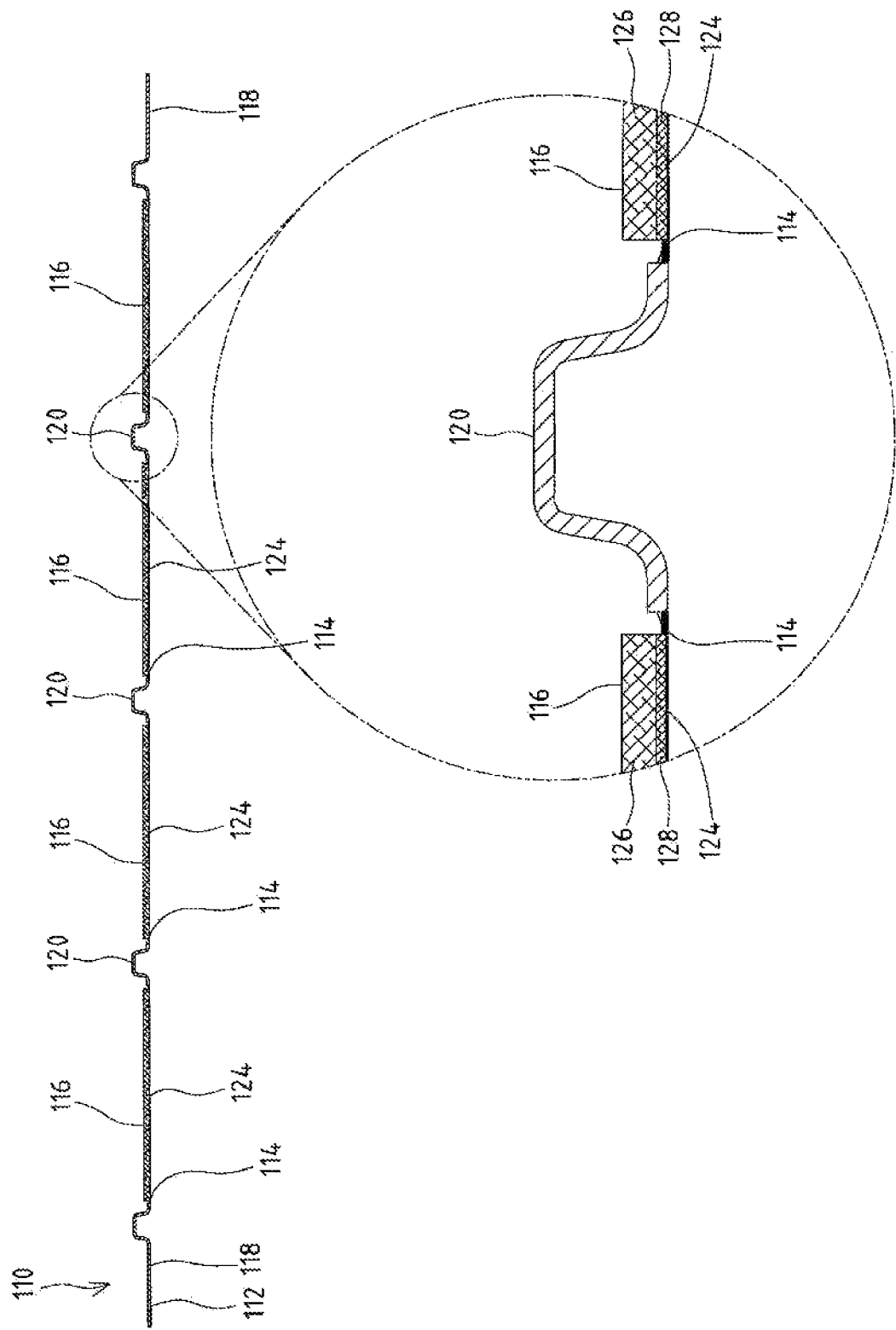
FIG. 12 is an end view taken along line A-A in FIG. 11.
Figure 13:
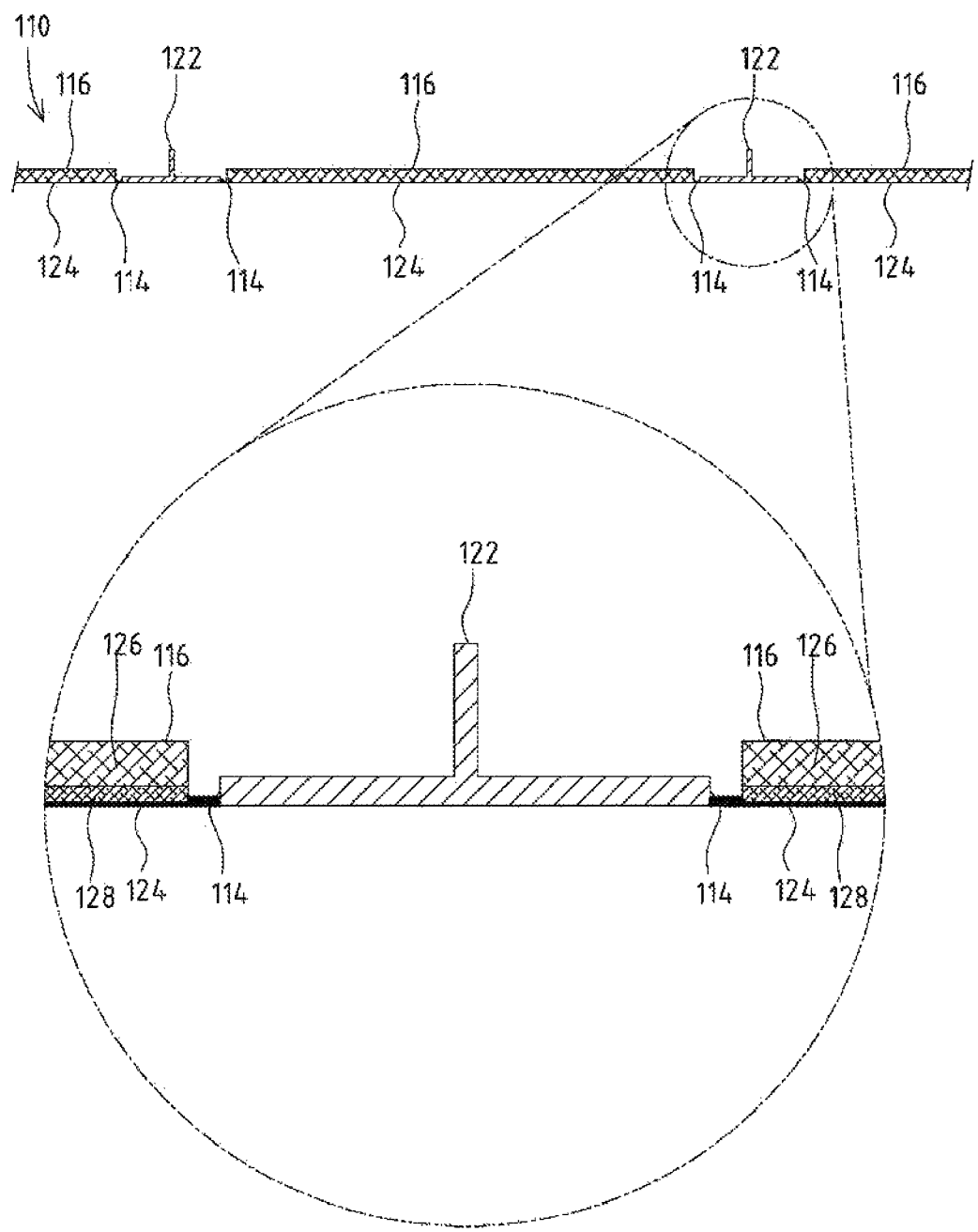
FIG. 13 is an end view taken along line B-B in FIG. 11.

As illustrated in FIGS. 12 and 13, a lower surface of the sound absorbing part 116 has a melt layer 124 having lower air permeability than other portion of the sound absorbing part 116. The melt layer 124 is a layer obtained by melting and solidifying a surface (one surface) of the porous body constituting the sound absorbing part 116. The melt layer 124 has air permeability in a thickness direction (an up-down direction) of the sound absorbing part 116. The air permeability of the melt layer 124 is lower than that of a portion of the sound absorbing part 116 on the upper side from the melt layer 124. A density of the melt layer 124 is higher than that of a portion of the sound absorbing part 116 on the upper side from the melt layer 124. The melt layer 124 is harder than a portion of the sound absorbing part 116 on the upper side from the melt layer 124. Surface roughness of a lower surface of the melt layer 124 (a lower surface of the sound absorbing part 116) is smaller than surface roughness of an upper surface of the sound absorbing part 116 on which the melt layer 124 is not formed. The lower surface of the melt layer 124 is smooth. For example, the surface roughness of the lower surface of the melt layer 124 is about 50 μm or less.

The sound absorbing part 116 of the second embodiment is made by a fiber body such as a nonwoven fabric. As illustrated in FIGS. 12 and 13, the sound absorbing part 116 includes a first fiber layer 126 constituting the upper side of the sound absorbing part 116 and a second fiber layer 128 constituting the lower side of the sound absorbing part 116. The melt layer 124 constitutes a lower part of the second fiber layer 128. The melt layer 124 of the second embodiment is formed by melting the lower part of the second fiber layer 128. The melt layer 124 covers the lower side of the second fiber layer 128. In the second embodiment, the first fiber layer 126 is the thickest in the sound absorbing part 116. In the sound absorbing part 116, the melt layer 124 is thinnest. The thickness of the melt layer 124 is about from 0.1 mm to 0.9 mm. Air permeability of the sound absorbing part 116 decreases in the order of the first fiber layer 126, the second fiber layer 128, and the melt layer 124.

A thickness of the first fiber layer 126 is set to, for example, about from 7 mm to 30 mm. A basis weight of the first fiber layer 126 is, for example, about from 600 g/m 2 to 1800 g/m$^2$. A density of the first fiber layer 126 is, for example, about from 0.02 g/cm$^3$ to 0.25 g/cm$^3$.

A thickness of the second fiber layer 128 is set to, for example, about from 0.5 mm to 2 mm. A basis weight of the second fiber layer 128 is, for example, about from 200 g/m$^2$ to 600 g/m$^2$. A density of the second fiber layer 128 is, for example, about from 0.1 g/cm$^3$ to 1.2 g/cm$^3$.

The second fiber layer 128 has higher water repellency than the first fiber layer 126. Examples of a method of securing water repellency include adding a water repellent material such as, for example, a silicone resin or a fluororesin to the second fiber layer 128, and making the second fiber layer 128 with a material such as a fiber having water repellency. Further, water repellency can also be improved by making the density (the basis weight) of the second fiber layer 128 higher than that of the first fiber layer 126.

Figure 14:
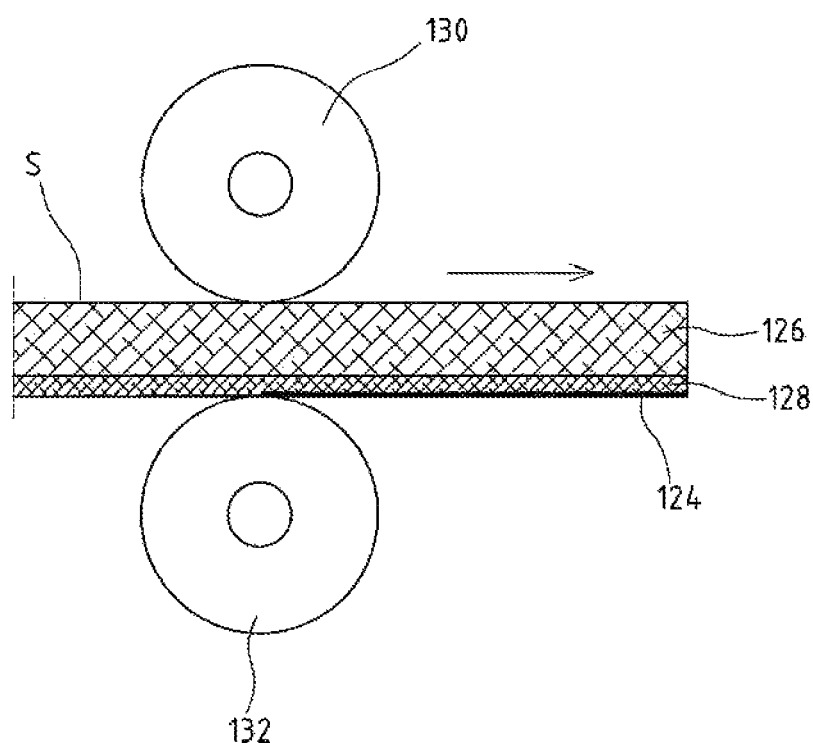
FIG. 14 is an explanatory view illustrating a manufacturing step of the vehicle undercover according to the second embodiment.

Next, a manufacturing method for the engine undercover 110 described above will be described. The engine undercover 110 can be obtained by insert molding. The support body 112 is molded in a molding die 136 in which a sheet S to be the sound absorbing part 116 is set. The sheet S is a sound absorbing sheet. First, as illustrated in FIG. 14, the sheet S including the first fiber layer 126 and the second fiber layer 128 is prepared. The sheet S is passed between a pair of rolls 130 and 132. Here, among the pair of rolls 130 and 132, the second roll 132 in contact with the second fiber layer 128 is heated. This causes a part of the second fiber layer 128 in a thickness direction to be melted on one surface of the sheet S, to form the melt layer 124. Another surface of the sheet S remains as the first fiber layer 126.

Next, the sheet S on which the melt layer 124 is formed is cut with a Thomson blade or the like. At this time, a slit 134 (see FIG. 15A) is formed in the sheet S in accordance with a planned formation position of the frame parts 120 and 122. Further, a connection portion is provided by uncutting a planned crossing portion between the longitudinal frame part 120 and the transverse frame part 122 in the sheet S. This maintains a state in which the sheet S is connected as one sheet.

Figure 15A:
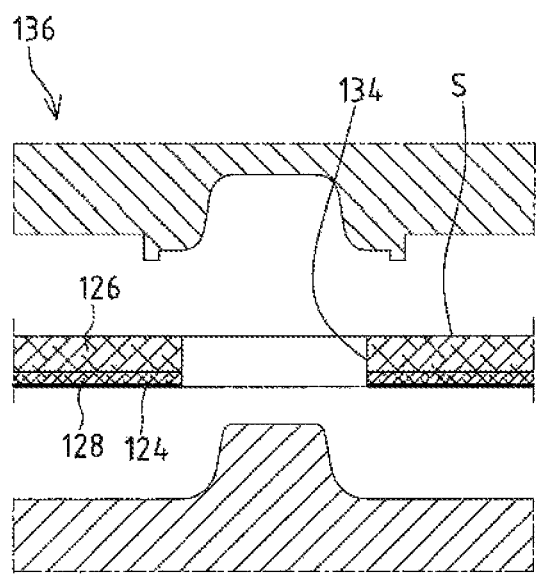
FIG. 15A is an explanatory view illustrating a manufacturing step of the vehicle undercover according to the second embodiment.
Figure 15B:
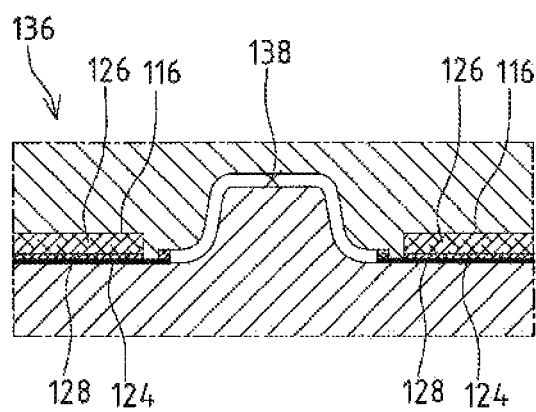
FIG. 15B is an explanatory view illustrating the manufacturing step of the vehicle undercover according to the second embodiment.
Figure 15C:
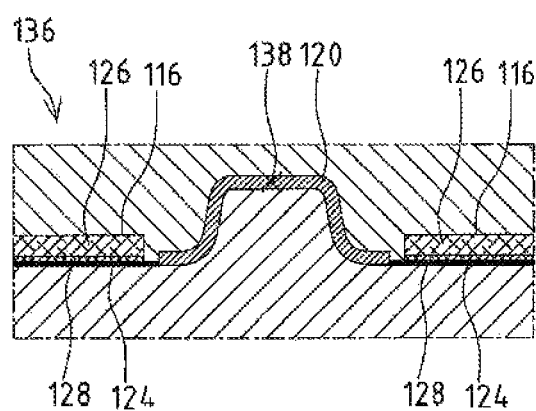
FIG. 15C is an explanatory view illustrating the manufacturing step of the vehicle undercover according to the second embodiment.
Figure 15D:
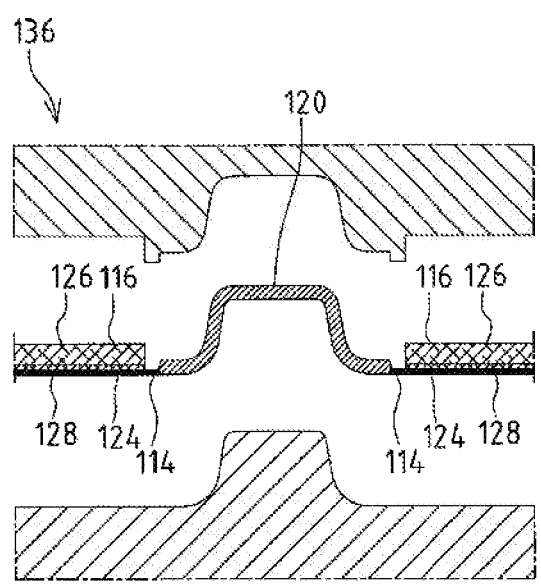
FIG. 15D is an explanatory view illustrating the manufacturing step of the vehicle undercover according to the second embodiment.

The sheet S on which the melt layer 124 and the slit 134 are formed is set in the molding die 136 (see FIG. 15A). The molding die 136 is closed. At this time, a part of an opening edge or the like of the slit 134 in the sheet S is made to face a cavity 138 that molds the support body 112 (see FIG. 15B). When the molding die 136 is closed, a connection portion connecting the sheet S may be broken by unevenness of a mold surface of the molding die 136. Then, the support body 112 is injection-molded in a state where a part of the sheet S faces the cavity 138 forming the support body 112 (see FIG. 15C). At this time, the connection portion connecting the sheet S may be melted and broken by a high-temperature molten resin. As a result, an end part (a part) of the sound absorbing part 116 obtained by being divided from the sheet S is welded in a state of entering inside the support body 112. As a result, the end part of the sound absorbing part 116 and the support body 112 are integrated. Then, the engine undercover 110 is removed from the molding die 136. In the obtained engine undercover 110, the opening portion 114 is closed by the sound absorbing part 116 divided for each opening portion 114 of the support body 112 (see FIG. 15D).

The engine undercover 110 includes the melt layer 124 in the sound absorbing part 116. This allows sound to be absorbed in a wide frequency band from a low frequency band to a high frequency band. Therefore, sound absorbing performance of the engine undercover 110 can be improved. The engine undercover 110 can suitably absorb road noise particularly in a frequency band of from 1000 Hz to 1250 Hz. As a fiber diameter decreases, for example, the sound absorbing performance of the sound absorbing part 116 is improved, but cost required for the sound absorbing part 116 increases. According to the engine undercover 110 of the second embodiment, by forming the melt layer 124, desired sound absorbing performance can be secured even when a fiber body of a large fiber diameter and low cost is used.

The engine undercover 110 includes the melt layer 124 in the sound absorbing part 116. Rigidity of the sound absorbing part 116 can be improved by the melt layer 124 having a higher density than other portion of the sound absorbing part 116. Therefore, in the engine undercover 110, the sound absorbing part 116 can be widely set, and the sound absorbing performance can be improved. The engine undercover 110 can improve chipping resistance and wear resistance on the lower surface of the sound absorbing part 116, by the melt layer 124 having a higher density than other portion of the sound absorbing part 116. Therefore, even if a scattering stone or the like hits the engine undercover 110, the sound absorbing part 116 is less likely to be damaged, and durability is excellent. Since the engine undercover 110 includes the melt layer 124 in the sound absorbing part 116, the lower surface of the sound absorbing part 116 is smooth. Therefore, wettability of the lower surface of the sound absorbing part 116 can be lowered, and icing and water immersion in the sound absorbing part 116 can be prevented, for example. Therefore, the engine undercover 110 can prevent deterioration of sound absorbing performance due to water entering the sound absorbing part 116, breakage of the sound absorbing part 116 due to icing, and the like.

Since the melt layer 124 is a layer in which a surface of the porous body constituting the sound absorbing part 116 is melted and solidified, time and effort for bonding and the like of the melt layer 124 to the sound absorbing part 116 is not necessary. Therefore, the sound absorbing performance of the sound absorbing part 116 can be easily improved.

The second fiber layer 128 having better water repellency than the first fiber layer 126 is provided on the lower side of the sound absorbing part 116. Since the second fiber layer 128 having such favorable water repellency is provided, wettability of the lower side of the sound absorbing part 116 can be lowered. For example, icing or water immersion in the sound absorbing part 116 can be prevented. Therefore, the engine undercover 10 can prevent deterioration of sound absorbing performance due to water entering the sound absorbing part 116, breakage of the sound absorbing part 116 due to icing, and the like.

In the manufacturing method described above, the sheet S is divided to form the sound absorbing part 116 corresponding to the opening portion 114 of the support body 112 when the support body 112 is molded by the molding die 136. Therefore, it is not necessary to prepare the sound absorbing parts 116 having the number and shape corresponding to the plurality of opening portions 114 in the support body 112, and it is only necessary to prepare one sheet S. Further, it is only necessary to set one sheet S in the molding die 136, and time and effort is not necessary for setting a plurality of sound absorbing parts 116 according to the plurality of opening portions 114 in the support body 112 into the molding die 136. In this way, according to the manufacturing method described above, by simply forming the melt layer 124 on one surface of the sheet S in advance, it is possible to easily obtain the engine undercover 110 in which the support body 112 is connected with the sound absorbing part 116 divided for each opening portion 114 of the support body 112.

Modified Example

The present disclosure is not limited to the above-described matters, and for example, and may be as follows. Note that the disclosure is not limited only to the specific description of the embodiments described above and the following modified examples.

(1) The configuration in which rigidity of the second frame part is made lower than that of the first frame part is not limited to the embodiment. For example, the rigidity may be made lower than that of the first frame part by reducing a thickness of the second frame part.

(2) An opening for maintenance can be provided by cutting out a part of the vehicle undercover, and an openable lid may be attached to the opening.

(3) A periphery of the drain hole provided in the plate-shaped body may be impregnated with a resin material. In addition, by molding with the resin impregnated in the plate-shaped body and a mold at the time of insert molding, a guide path to guide water toward the drain hole may be provided in the plate-shaped body.

(4) The upper surface of the sound absorbing part may be formed by a second melt layer having higher air permeability than the melt layer of the lower surface. For example, as a layer configuration of the embodiment, the second melt layer may simply be formed by melting the upper part of the first fiber layer. In this way, by providing the second melt layer on the upper surface of the sound absorbing part, it is possible to make it difficult for water placed on the undercover to penetrate into the sound absorbing part.

(5) The sound absorbing part is not limited to the three-layer structure, and may have a two-layer structure of the melt layer and another layer or a layer structure of four or more layers.

(6) The vehicle undercover can also be obtained by, for example, bonding the sound absorbing part to the support body with an adhesive, or welding the sound absorbing part to the support body by ultrasonic waves or the like, after molding the support body.

(7) The formation of the melt layer is not limited to the heat roll, and the melt layer may be formed by, for example, hot pressing or the like in which one die is heated to a high temperature.

(8) The fiber layer is not limited to be formed of a single fiber, and may be formed of a plurality of types of fibers, or may be formed by mixing a material other than the fibers with the fibers. Examples of other materials include glass.

An engine undercover is installed on a lower side of an engine in a vehicle in order to reduce engine sound (see, for example, JP-A No. 2013-86599). Such an engine undercover absorbs sound such as engine sound, by being formed by compression molding of fibers.

In order to ensure quietness of the vehicle, the engine undercover is required to exhibit sound absorbing performance in a wider frequency band.

The present disclosure describes an example of a vehicle undercover according to the following aspect as a means for solving the above another problem.

A vehicle undercover including:
a support body; and
a sound absorbing part that is provided to close an opening portion sectioned by the support body and has air permeability, in which
a lower surface of the sound absorbing part is formed by a melt layer having lower air permeability than other portion of the sound absorbing part.

The vehicle undercover according to the above aspect has excellent sound absorbing performance.

The disclosure describes a manufacturing method for a vehicle undercover according to the following aspect as a means for solving the above another problem.

A manufacturing method for a vehicle undercover in which the manufacturing method includes:
forming a melt layer on one surface of a sound absorbing sheet by heating and melting the one surface of the sound absorbing sheet having air permeability; and
molding a support body after setting the sound absorbing sheet in a molding die, and forming, from the sound absorbing sheet, a sound absorbing part that closes an opening portion sectioned by the support body.

According to the manufacturing method for a vehicle undercover according to the above aspect, a vehicle undercover having excellent sound absorbing performance can be obtained.

The present disclosure claims priority based on Japanese Patent Application No. 2021-6700 filed in Japan on Jan. 19, 2021, and Japanese Patent Application No. 2021-96706 filed in Japan on Jun. 9, 2021, the contents of which are incorporated herein by reference. The contents described in the patents, patent applications, and documents cited in the disclosure are incorporated herein by reference.

REFERENCE SIGNS LIST 10, 110 engine undercover (vehicle undercover)
12 plate-shaped body
14 support body
20 first frame part
20a transverse plate
20b longitudinal plate
20c inclined part
22 second frame part
112 support body
114 opening portion
116 sound absorbing part
124 melt layer
126 first fiber layer
128 second fiber layer
136 molding die

The invention claimed is:

1. A vehicle undercover comprising:
a plate-shaped body that is porous; and
a support body to support the plate-shaped body,
wherein the support body includes:
a first frame part having a groove shape, and including a transverse plate and longitudinal plates respectively extending from both edges of the transverse plate; and
a second frame part provided so as to intersect with the first frame part and having a smaller protruding dimension toward a vehicle inner side than a protruding dimension of the first frame part.

2. The vehicle undercover according to claim 1, wherein the first frame part has a groove shape that is recessed from a vehicle outer side to a vehicle inner side, is opened on a vehicle front side, and extends in a front-rear direction of a vehicle.

3. The vehicle undercover according to claim 1, wherein the first frame part includes an inclined part that is continuous with the transverse plate and is inclined to a vehicle outer side on progression toward a vehicle rear side from a vehicle front side.

4. The vehicle undercover according to claim 1, wherein:
the first frame part is provided between plate-shaped bodies, and
the second frame part is provided to overlap with the plate-shaped body.

5. The vehicle undercover according to claim 1, wherein:
the second frame part includes a connection portion connected to a longitudinal plate of the first frame part, and
a lower part of the connection portion is formed to be wider than an upper part of the connection portion.

6. The vehicle undercover according to claim 1, comprising an opening portion sectioned by the support body, wherein:
a sound absorbing part is constituted by the plate-shaped body that closes the opening portion,
the sound absorbing part has air permeability, and
a lower surface of the sound absorbing part is formed by a melt layer having lower air permeability than other portions of the sound absorbing part.

7. The vehicle undercover according to claim 6, wherein the melt layer is a layer in which a surface of the plate-shaped body is melted and solidified.

8. The vehicle undercover according to claim 6, wherein:
the sound absorbing part includes:
a first fiber layer constituting an upper side of the sound absorbing part; and
a second fiber layer constituting a lower side of the sound absorbing part and having higher water repellency than the first fiber layer, and
the melt layer constitutes a lower part of the second fiber layer.

9. The vehicle undercover according to claim 6, wherein an upper surface of the sound absorbing part includes a second melt layer having higher air permeability than the melt layer.

10. A manufacturing method for a vehicle undercover, wherein the manufacturing method comprises:
setting a plate-shaped body, that is porous, in a molding die;
molding, in the molding die, a support body made of a synthetic resin and including a first frame part and a second frame part, in which the first frame part has a groove shape formed by a transverse plate and longitudinal plates respectively extending from both edges of the transverse plate, and the second frame part is provided so as to intersect with the first frame part and has a smaller protruding dimension toward a vehicle inner side than a protruding dimension of the first frame part; and
obtaining a vehicle undercover in which the plate-shaped body and the support body are joined.

11. The manufacturing method for a vehicle undercover according to claim 10, comprising:
molding the first frame part between plate-shaped bodies; and
molding the second frame part to overlap with the plate-shaped body.

12. The manufacturing method for a vehicle undercover according to claim 10, wherein a lower part of the second frame part at a connection portion between the second frame part and a longitudinal plate of the first frame part is formed to be wider than an upper part of the second frame part.

13. The manufacturing method for a vehicle undercover according to claim 10, comprising:
forming a melt layer on one surface of the plate-shaped body by heating and melting the one surface of the plate-shaped body having air permeability; and
forming, from the plate-shaped body, a sound absorbing part that closes an opening portion sectioned by the support body, when the support body is molded in the molding die in which the plate-shaped body is set.

* * * * *